(12) United States Patent
Guo et al.

(10) Patent No.: US 6,546,362 B1
(45) Date of Patent: Apr. 8, 2003

(54) MOLD DESIGN SYSTEM AND RECORDING MEDIUM

(75) Inventors: Fu Guo, Kawasaki (JP); Tadakatsu Yoshikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 412 days.

(21) Appl. No.: 09/639,095

(22) Filed: Aug. 16, 2000

Related U.S. Application Data

(63) Continuation of application No. PCT/JP99/01300, filed on Mar. 16, 1999.

(30) Foreign Application Priority Data

Mar. 19, 1998 (JP) .............................. 10-070014

(51) Int. Cl.$^7$ ..................... G06F 17/50; G06F 17/10; G06G 7/48
(52) U.S. Cl. ................. 703/1; 703/2; 703/6; 703/7
(58) Field of Search ................... 703/1, 2, 6, 7

(56) References Cited

FOREIGN PATENT DOCUMENTS

JP  09231410 A  5/1997

OTHER PUBLICATIONS

Nee, A.Y.C., et al., "Automatic Determination of 3–D Parting Lines and Surfaces in Plastic Injection Mould Design," CIRP ANNALS, vol. 47, No. 1(1998), pp. 95–98.

Primary Examiner—Todd Ingberg
Assistant Examiner—W Thomson
(74) Attorney, Agent, or Firm—Staas & Halsey LLP

(57) ABSTRACT

To quickly determine a parting line, a mold design system first obtains the orientations of faces constituting an article to be produced using a mold, and then classifies the faces according to their orientations. A boundary between faces that are classified into different sets is determined as a parting line. Thus, the parting line is automatically determined, permitting efficient mold design.

6 Claims, 22 Drawing Sheets

POINT AND CURVED LINES ON CURVED FACE

NORMAL LINES ON CURVED FACE

MOLD DESIGN SYSTEM AND RECORDING MEDIUM

This is a continuation of PCT/JP99/01300 filed Mar. 16, 1999.

BACKGROUND OF THE INVENTION

1. Filed of the Invention

This invention relates to a mold design system for designing, based on a given product shape, a shape of a mold used to manufacture molded articles, and more particularly, to a mold design system for deriving a parting line and an undercut necessary for designing such a mold shape.

2. Description of the Related Art

Process of molding plastics includes injection molding. In injection molding, a fixed quantity of a molten plastic material is injected into an injection mold to mold the plastic into shape. The plastic is thereafter removed from the mold, thus obtaining a product (including a component part etc.). When a plastic product or the like is designed, therefore, it is necessary that a mold for making the product should also be designed at the same time. Present-day product design is in most cases carried out by means of CAD (Computer Aided Design), and accordingly, molds also are designed based on CAD data of products.

A general procedure for designing a mold is as follows:

1) The direction of withdrawing a product is determined, and an undercut is checked.
2) The product is positioned relative to a mold base, and the undercut is dealt with by a slide arrangement or the like.
3) A parting line of the product is set. In this case, outer peripheral edges of the product need to be obtained as the parting line. In cases where the product has a hole therein, peripheral edges of the hole also need to be obtained as a parting line.
4) Based on the parting line thus obtained, a parting face is obtained.
5) The product part is removed from the mold base, which is then divided at the parting face.

FIG. 20 shows parting lines of a product, by way of example. A product model 100 shown in the figure is in the form of a box having a cavity therein. The box opens at its bottom and has a rectangular hole in its top face. When designing a mold base corresponding to this product model 100, a parting line 101 for the outer peripheral portion of the box and a parting line 102 for the hole in the top face are determined. Once the parting lines are determined, parting faces of the mold base can be determined based on the parting lines.

FIG. 21 shows the parting faces of the mold base. The mold base 200 comprises at least two parts 210 and 220 positioned above and below (in Z-axis direction). The upper part 210 is called cavity-side part, and the lower part 220 is called core-side part. A parting face 201 for the outer peripheral portion is determined by the corresponding parting line 101, and a parting face 202 for the hole is determined by the corresponding parting line 102.

Thus, when designing a mold, how to determine the parting line is a matter of importance. In a conventional mold design system, therefore, when an edge which is to constitute the parting line is selected by the designer, edges connected with the selected edge are distinctively shown on screen, thereby assisting the work of deciding the parting line. The designer successively selects suitable edges from among those shown on screen, whereupon the parting line is determined.

FIG. 22 illustrates the method of determining a parting line in the conventional system. In the product model 100, an edge 111 connecting points T3 and T2, for example, is selected, whereupon the edges continuous with point T2 are shown distinctively as selectable edges. In the illustrated example, an edge 112 connecting points T2 and T6 and an edge 113 connecting points T2 and T1 are distinctively shown. When a plurality of edges are shown, which edge is to be selected as the parting line is left to the designer's judgment.

However, if the product shape is complicated, the parting line is constituted by a large number of edges, and the manual selection of edges consumes much time.

Also, after the parting line is determined, it is necessary to make a check as to whether an undercut exists or not. In a conventional method of determining whether or not an undercut exists, a straight line extending in the withdrawing direction is randomly generated and a portion where the straight line intersects the product twice or more is detected. To increase the detection accuracy, an increased number of straight lines need to be generated, but this requires correspondingly prolonged time.

Thus, the conventional mold design method is associated with a problem that the decision of a parting line consumes much time and labor, imposing a heavy load on the mold designer.

SUMMARY OF THE INVENTION

Taking the above into consideration, an object of the present invention is to automate the parting line decision process, thereby improving the efficiency of mold design.

To solve the aforementioned problems, a mold design system for designing a mold for making molded articles is provided which comprises face orientation acquiring means for obtaining orientations of faces constituting a shape of an article to be produced using the mold, face classifying means for classifying the faces into a plurality of sets according to the respective orientations obtained by the face orientation acquiring means, and parting line determining means for determining, as a parting line of the mold for forming the article shape, a boundary between faces that are classified into different sets by the face classifying means.

With this mold design system, the face orientation acquiring means obtains the orientations of faces that constitute the shape of an article to be produced using the mold. Then, according to the orientations of the faces obtained by the face orientation acquiring means, the face classifying means classifies the faces into a plurality of sets. The parting line determining means determines, as the parting line of the mold for forming the article shape, a boundary between faces that are classified into different sets by the face classifying means.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
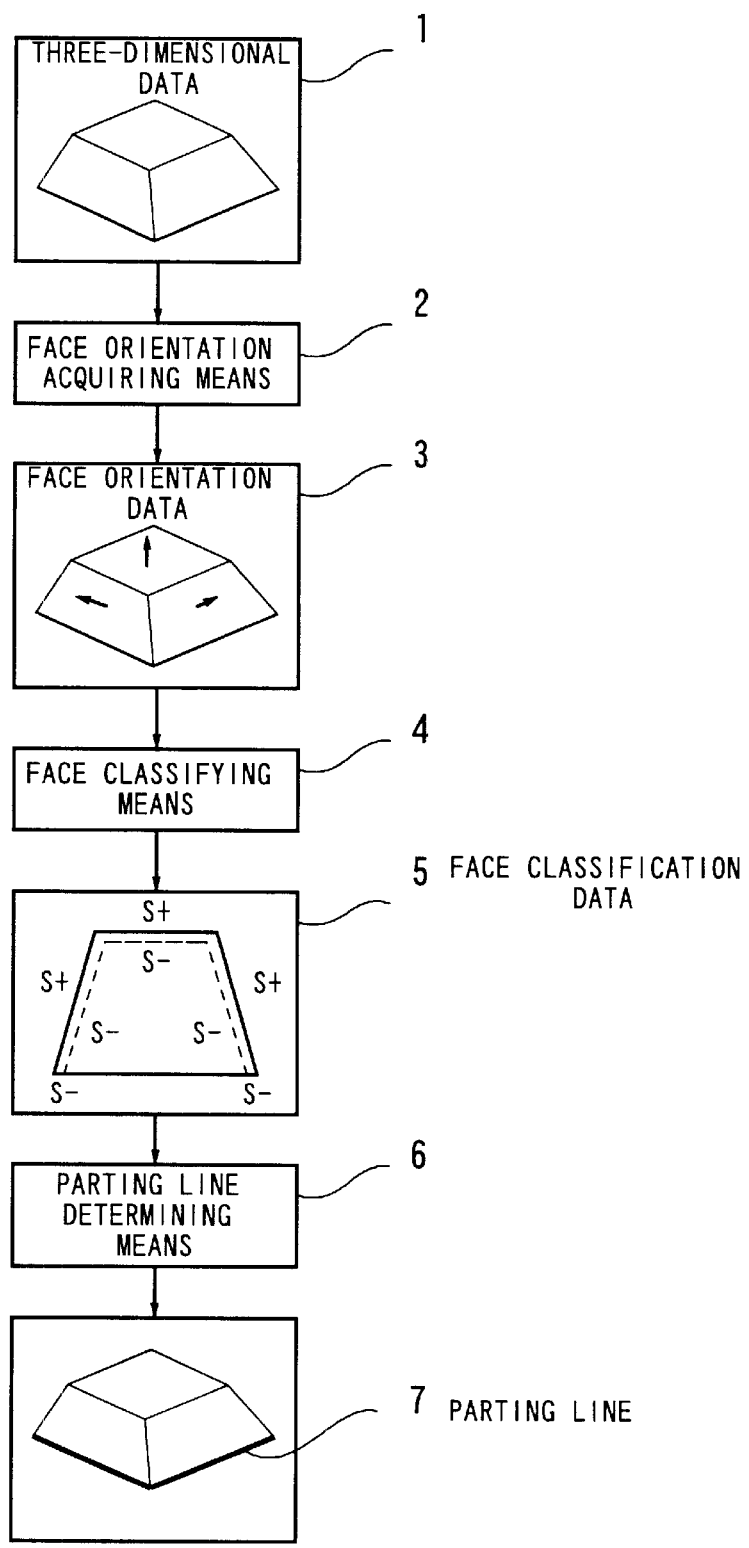
FIG. 1 is a diagram illustrating principles of the present invention.

FIG. 1 illustrates the principles of the present invention. In a mold design system for designing a mold for making molded articles, the shape of an article to be produced using the mold is represented by three-dimensional data 1. Based on the three-dimensional data 1, face orientation acquiring means 2 obtains the orientations of faces constituting the shape of the article to be produced using the mold. The orientation of each face is obtained by calculating a normal vector at a point on the corresponding face. As a result, face orientation data 3 indicative of the orientations of the individual faces is generated. Face classifying means 4 analyzes the face orientation data 3 obtained by the face orientation acquiring means 2, and classifies the faces into a plurality of sets according to the face orientations. For example, the faces are classified into a set of faces oriented at an acute angle to the direction of withdrawing the mold, and a set of faces oriented at an obtuse angle to the withdrawing direction. The results of classification are output as face classification data 5 indicating to which set each face belongs. Based on the face classification data 5 obtained by the face classifying means 4, parting line determining means 6 determines, as a parting line of the mold for forming the article shape, a boundary between faces that are classified into different sets.

This makes it possible to automatically determine the parting line of a mold for making molded articles, and as a consequence the efficiency of mold design work improves.

The hardware configuration of a CAD system having the function of the mold design system according to the present invention will be now described.

Figure 2:
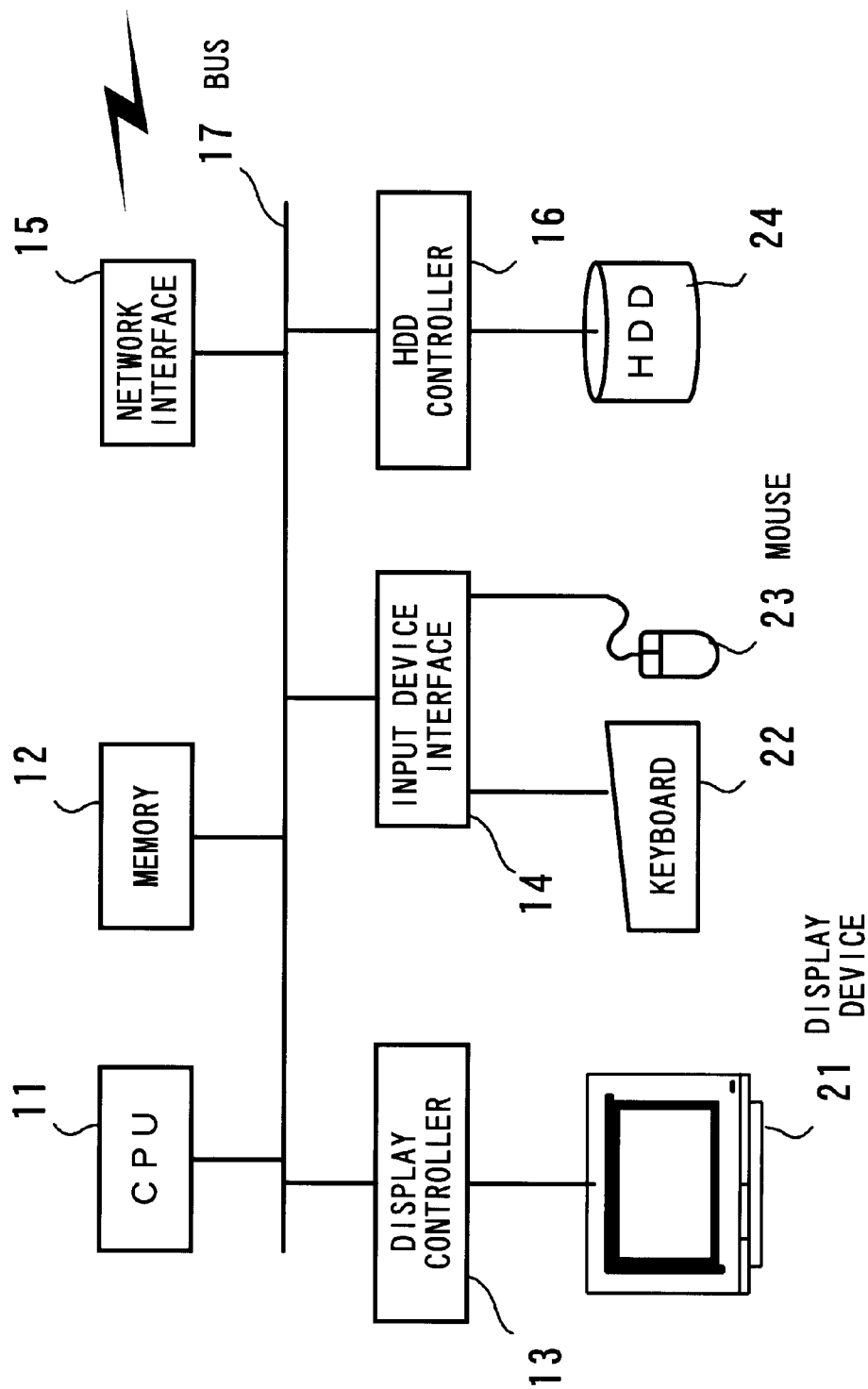
FIG. 2 is a diagram of a hardware configuration of a CAD system for carrying out the present invention.

FIG. 2 illustrates the hardware configuration of a CAD system for carrying out the present invention. The CAD system has a configuration including a CPU (Central Processing Unit) 11 as its principal element. The CPU 11 performs calculations for determining parting lines and for designing a mold in accordance with programs stored in a memory 12, and also controls various devices connected thereto via a bus 17. Peripheral devices connected to the bus 17 include the below-mentioned devices.

A display controller 13 generates a display image in accordance with a draw instruction supplied thereto from the CPU 11, and outputs the generated display image to a display device 21 connected thereto. In accordance with the display image information supplied from the display controller 13, the display device 21 displays the image on its screen.

An input device interface 14, to which a keyboard 22 and a mouse 23 are connected, transfers input signals from the keyboard 22 and the mouse 23 to the CPU 11.

A network interface 15, which is connected to a LAN (Local Area Network), controls data communications through the LAN. Specifically, the network interface transfers data supplied thereto from the CPU 11 to other devices on the LAN; it also receives data transmitted via the LAN and supplies the received data to the CPU 11.

An HDD (Hard Disk Drive) controller 16, to which a storage device 24 such as a hard disk unit is connected, controls the input/output of data to/from the storage device 24. The storage device 24 stores programs to be executed by the CPU 11, such as system programs and a CAD program including a mold design program, as well as three-dimensional CAD data.

In the system as described above, the CAD program is executed by the CPU 11, whereupon the computer operates as a CAD system having the function of the mold design system according to the present invention. The processing function accomplished in this case by the CAD system will be described below.

Figure 3:
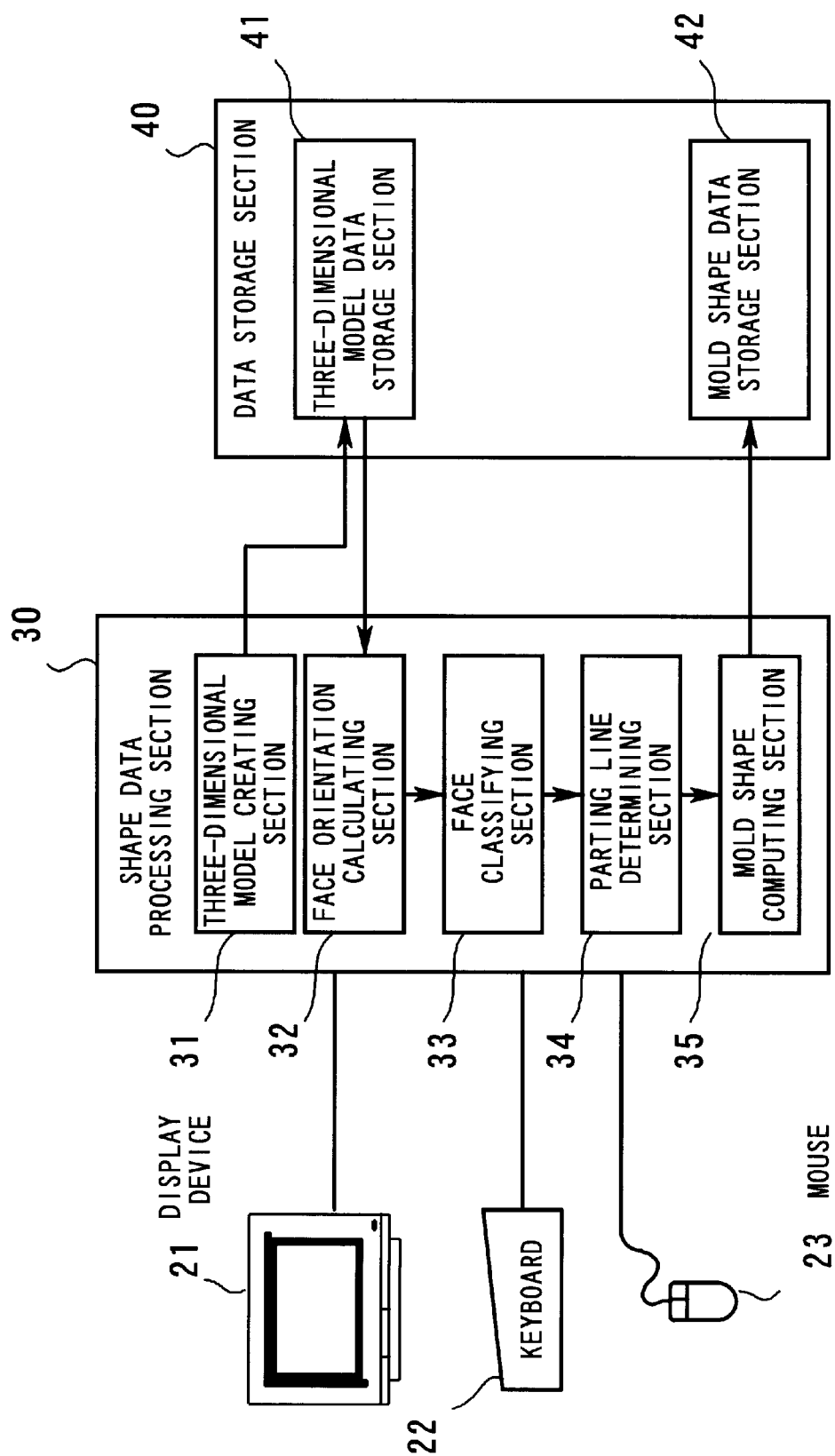
FIG. 3 is a functional block diagram of the CAD system to which the present invention is applied.

FIG. 3 is a functional block diagram of the CAD system to which the present invention is applied. The processing function of the present invention can be divided roughly into a shape data processing section 30 and a data storage section 40.

The shape data processing section 30 creates a three-dimensional model in accordance with data and commands input from input devices such as the keyboard 22 and the mouse 23, and also creates a cavity-side part and a core-side part of a mold. Further, the shape data processing section has the function of displaying the results of processing at the display device 21. To this end, the shape data processing section 30 comprises a three-dimensional model creating section 31, a face orientation calculating section 32, a face classifying section 33, a parting line determining section 34, and a mold shape computing section 35.

The three-dimensional model creating section 31 creates a three-dimensional model in accordance with inputs from the input devices. The created three-dimensional model is stored in a three-dimensional model data storage section 41 in the data storage section 40.

On receiving a mold design command for a certain three-dimensional model, the face orientation calculating means 32 first acquires data on faces constituting the specified three-dimensional model, from the three-dimensional model data storage section 41 in the data storage section 40, and then calculates orientations (normal vectors) of all faces constituting the three-dimensional model. The results of calculations are supplied to the face classifying section 33.

Based on the normal vector data supplied from the face orientation calculating section 32, the face classifying section 33 classifies the faces into faces which face upward and faces which face downward. In this embodiment, it is assumed that the mold is opened in a vertical direction (along Z axis), and therefore, the faces are classified into a set of faces oriented at an acute angle to the positive direction of the Z axis, and a set of faces oriented at an obtuse angle to the positive direction of the Z axis. The face classification results are supplied to the parting line determining section 34.

Based on the classification results supplied from the face classifying section 33, the parting line determining section 34 determines a parting line. Basically, an edge at the boundary between an upward-oriented face and a downward-oriented face is set as the parting line. Information on the determined parting line is supplied to the mold shape computing section 35.

Based on the information on the parting line supplied from the parting line determining section 34 and the information indicative of the shape of the three-dimension model which is the target of processing, the mold shape computing section 35 specifies a parting face and then calculates the shapes of cavity-side and core-side parts of the mold. The results of calculations are stored in a mold shape data storage section 42 in the data storage section 40.

The data storage section 40 is a storage device for storing the results of processing by the shape data processing section 30. Specifically, the three-dimensional model data storage section 41 stores three-dimensional data of articles to be produced, and the mold shape data storage section 42 stores the mold shape data calculated by the shape data processing section 30.

When designing a mold by using the CAD system, first, the mold designer inputs a command to the three-dimensional model creating section 31 with the use of the input device such as the keyboard 22, and designs the shape of a product or mold base by means of three-dimensional CAD. Data indicative of the created three-dimensional model is stored in the three-dimensional model data storage section 41. Where a three-dimensional model of a product designed by means of three-dimensional solid CAD is decomposed, a solid is constituted by a plurality of faces, and each face is constituted by a plurality of edges. Orientations of the faces are defined such that the outside of the solid is constituted by positive faces. For a plane face, the orientation thereof is represented by vector data indicative of a vector which is parallel to a normal line normal to the face and which is directed toward the outside of the solid.

After completion of the creation of the three-dimensional model, a mold is designed next. To carry out mold design, the parting line needs to be determined first. The following describes a procedure for determining the parting line for mold design. In the following, a solid constituted by plane faces only is taken as an example, and a solid including a curved face will be explained later.

Figure 4:
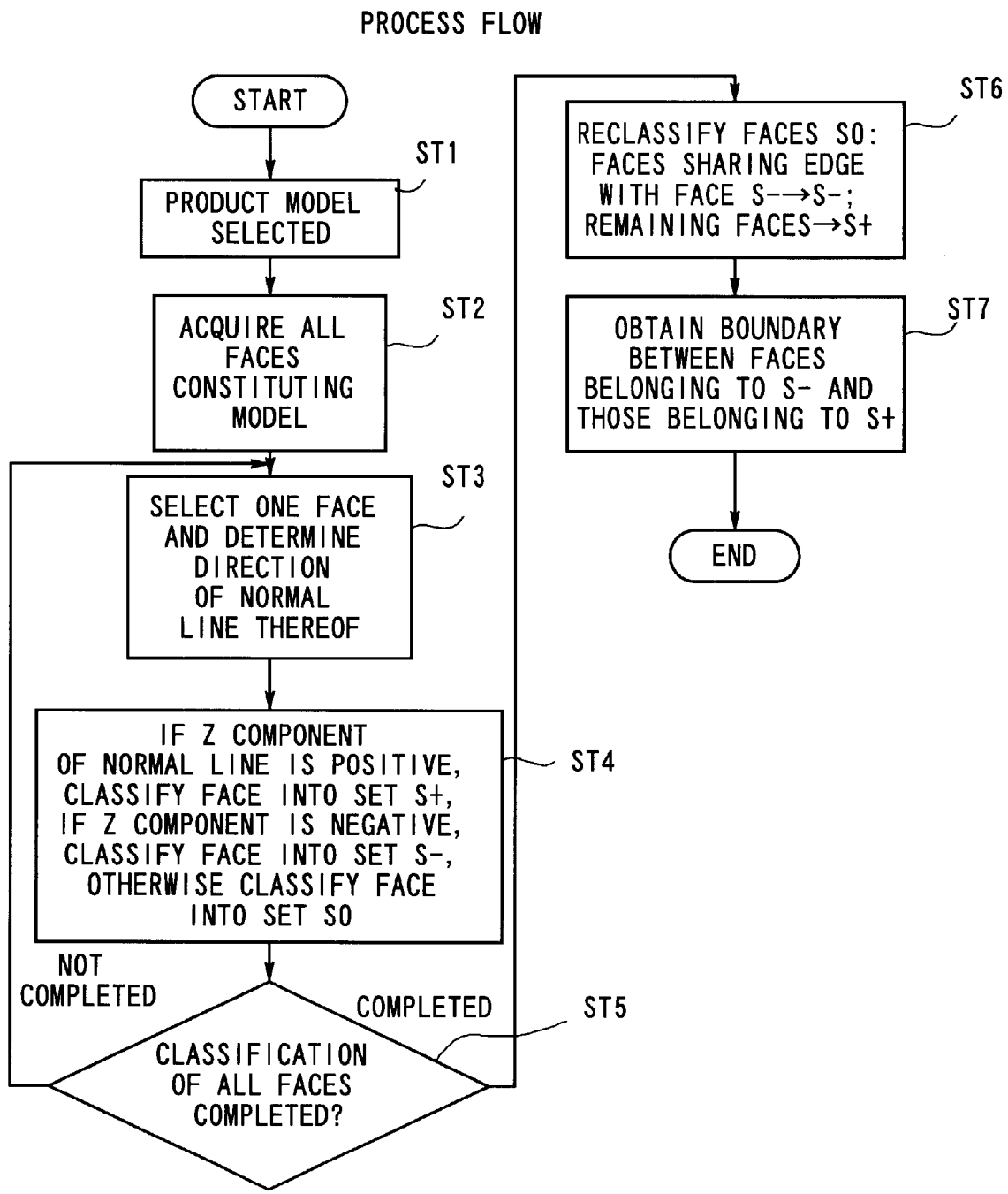
FIG. 4 is a flowchart showing the flow of a process for obtaining a parting line.

FIG. 4 is a flowchart illustrating the flow of a process for obtaining the parting line. In the following, the flowchart will be explained in order of step numbers.

[ST1] The designer operates the input device to select a product model for which the parting line is to be obtained.

[ST2] The face orientation calculating section 32 fetches three-dimensional model data corresponding to the selected product model from the three-dimensional model data storage section 41, and acquires data on all faces constituting the three-dimensional model.

[ST3] The face orientation calculating section 32 selects an unprocessed face and obtains a normal line and orientation of the selected face.

[ST4] The face classifying section 33 classifies the face according to the direction of the normal line obtained by the face orientation calculating section 32. It is here assumed that the upward direction in which the mold is withdrawn is the positive direction along the Z axis. The classification is performed in the manner described below.

Each face is classified in a manner such that, if the Z component of the normal line thereof is positive, the face is classified into a set S+, if the Z component is negative, the face is classified into a set S−, otherwise the face is classified into a set S0. In the case of plane faces, a plane face parallel to the Z axis is classified as S0.

[ST5] The face orientation calculating section 32 determines whether or not classification of all faces has been completed. If there exists an unprocessed face, the flow returns to Step ST3, and if all faces have been classified, the flow proceeds to Step ST6.

[ST6] The face classifying section 33 reclassifies the faces that have been classified into the set S0. Specifically, among the faces belonging to the set S0, those sharing a common edge with a face belonging to the set S− are searched for and reclassified into the set S−. The remaining faces are reclassified into the set S+.

[ST7] The parting line determining section 34 obtains a boundary between faces belonging to the set S− and those belonging to the set S+, and sets the boundary as a parting line which includes a plurality of closed loops.

The parting line obtained in this manner is supplied to the mold shape computing section 35, whereupon the mold shape computing section 35 obtains a parting face based on the parting line. The product part is then removed from the mold base, and the shapes of cavity-side and core-side parts are calculated such that the parts are divided at the parting face. The mold shape data thus derived is stored in the mold shape data storage section 42.

In this manner, the parting line is automatically determined, without the need for the selection etc. of the parting line by the designer, and a mold can be designed according to the parting line.

In the following, a specific example of parting line calculation process will be described.

Figure 5:
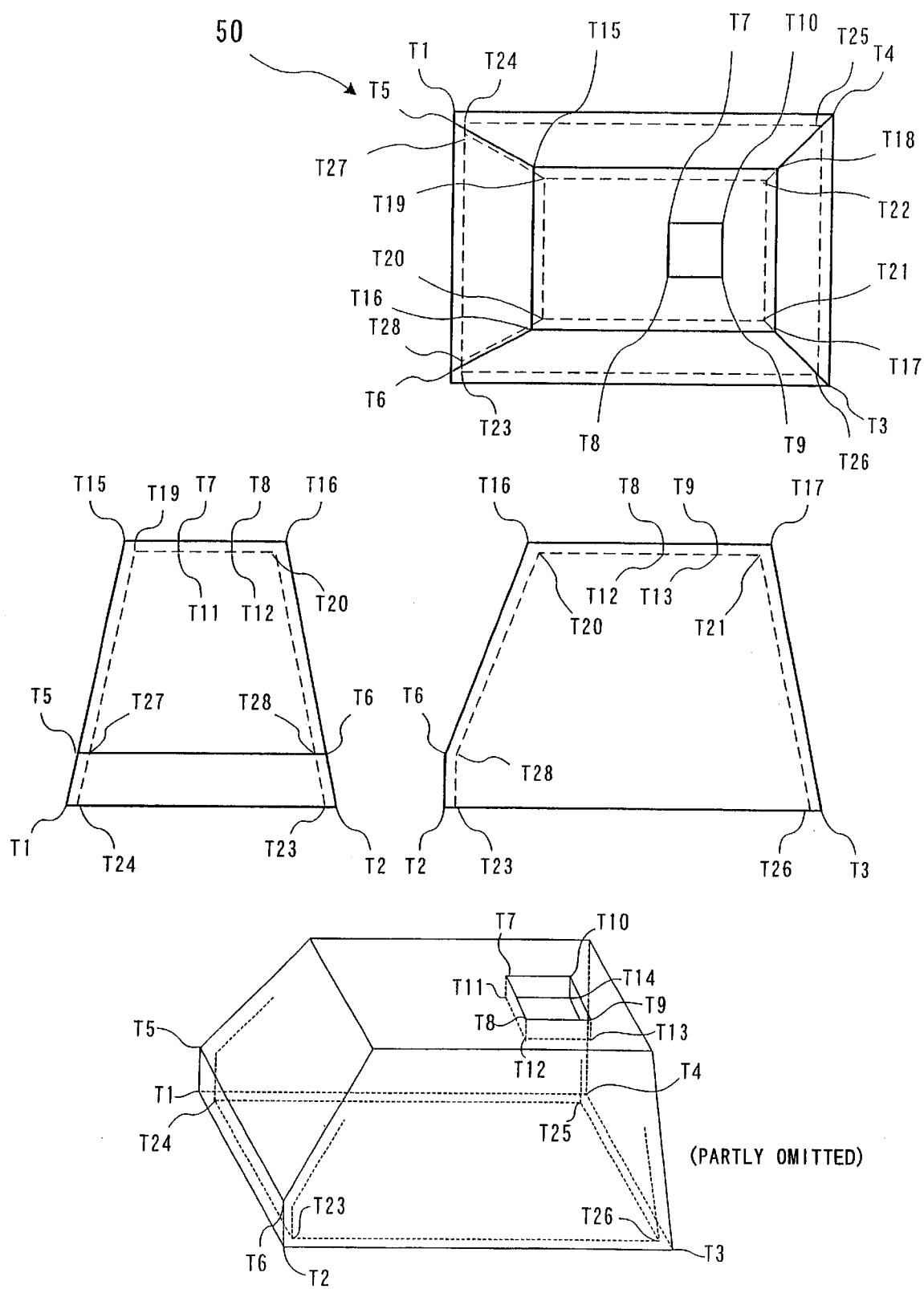
FIG. 5 shows an example of a three-dimensional product model.

FIG. 5 illustrates an example of a three-dimensional model of a product. A three-dimensional model 50 is in the form of a box having a cavity therein. The box opens at its bottom and has a square hole in its top face. The three-dimensional model 50 consists of edges connecting points T1 through T28 and faces surrounded by a plurality of edges. In FIG. 5, where points overlap each other, only those located on the near side are indicated by reference signs.

After the three-dimensional model 50 is selected in Step ST1, the face orientation calculating section 32 fetches all faces in Step ST2. The faces thus extracted are assigned respective identifiers.

Figure 6:
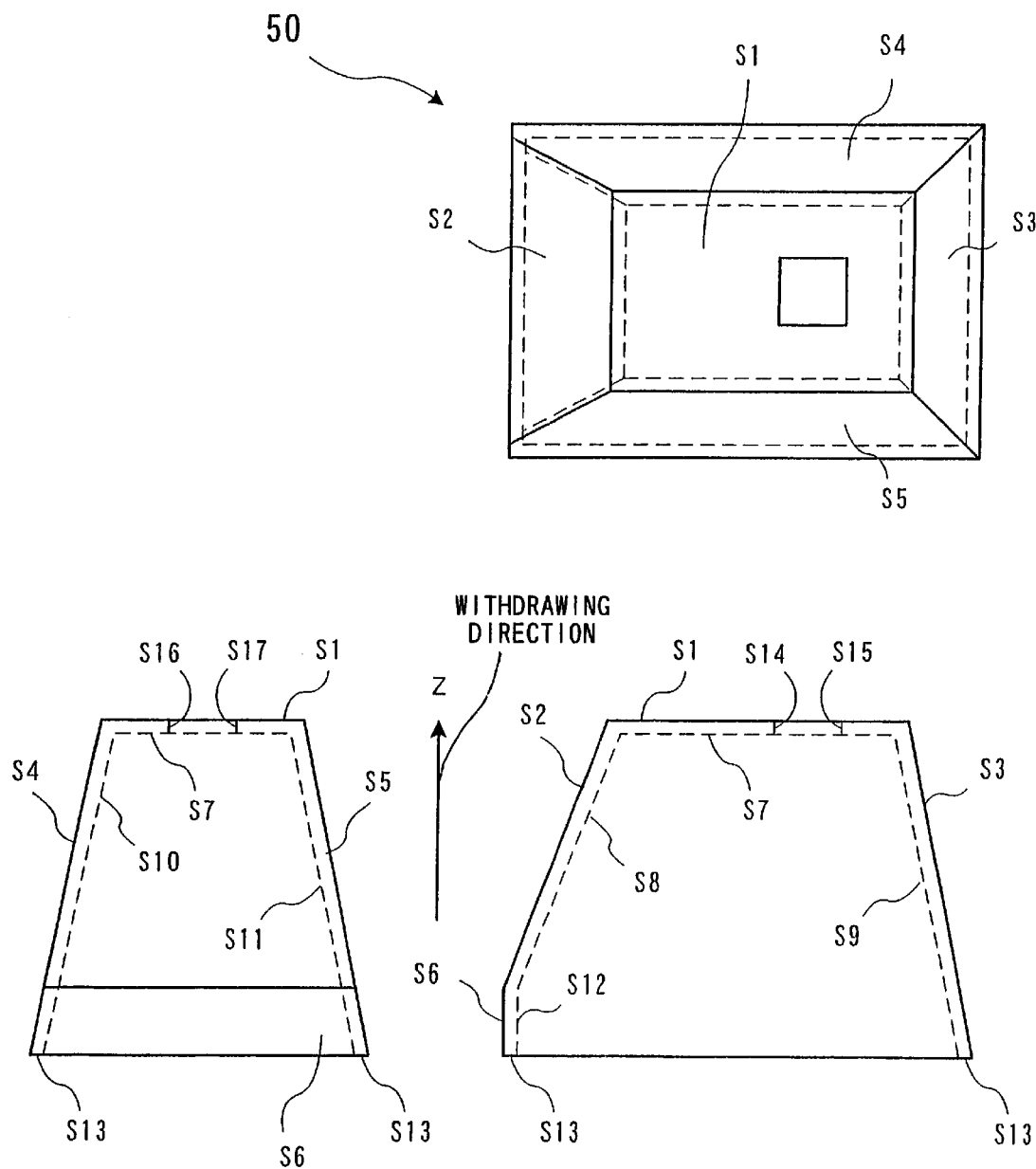
FIG. 6 shows extracted faces.

FIG. 6 illustrates the extracted faces. In the illustrated example, 17 faces S1 to S17 are extracted, and these faces S1 to S17 are all plane faces. It is here assumed that each face is assigned an identifier identical to that shown in the figure. The face data is managed in association with the identifiers.

Figure 7:
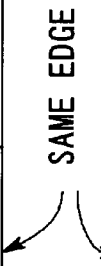
FIG. 7 illustrates a face data structure.

FIG. 7 illustrates a face data structure. The face data is composed of "FACE NAME", "NO. OF EDGES", and a set of "EDGE NAMES". For "FACE NAME", the identifier assigned to the face concerned is set. The number of edges constituting the face concerned is set as "NO. OF EDGES", and information identifying the individual edges of the face is set as "EDGE NAMES". In the illustrated example, each edge is named using the identifiers of its opposite end points. For example, the name of the edge connecting points T1 and T2 is "T1T2".

In FIG. 7, the face data of the faces S6 and S13 is shown by way of example. Comparison of data between the two faces S6 and S13 reveals that the two faces share a common edge T1T2.

Subsequently, in Step ST3, the orientation of each face is calculated.

Figure 8:
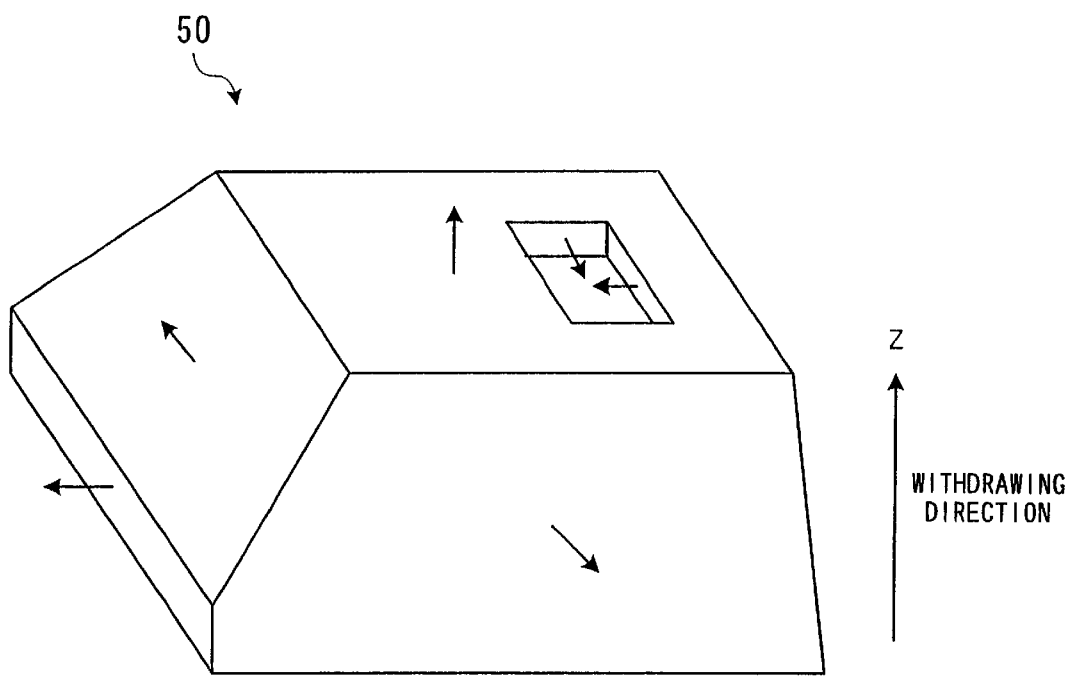
FIG. 8 is a diagram showing some of obtained normal lines.

FIG. 8 shows some of obtained normal lines. Normal lines like the illustrated ones are calculated for all faces, and the orientations of the faces are determined by the respective normal lines. Face orientation is represented by a unit vector (normal vector) which is parallel to the normal line and which is directed toward a side (outside) opposite the object defined by the three-dimensional model. In the data structure shown in FIG. 7, orientation-related data is not set as the face data, but the orientation of each face may be calculated when the three-dimensional model is created and the information obtained may be included in the face data. By storing in advance the orientations of the individual faces, it is possible to speed up the decision of the parting line.

After the face orientations are obtained, each face is classified into one of the three sets "S+", "S−" and "S0" by the face classifying section 33.

Figure 9:
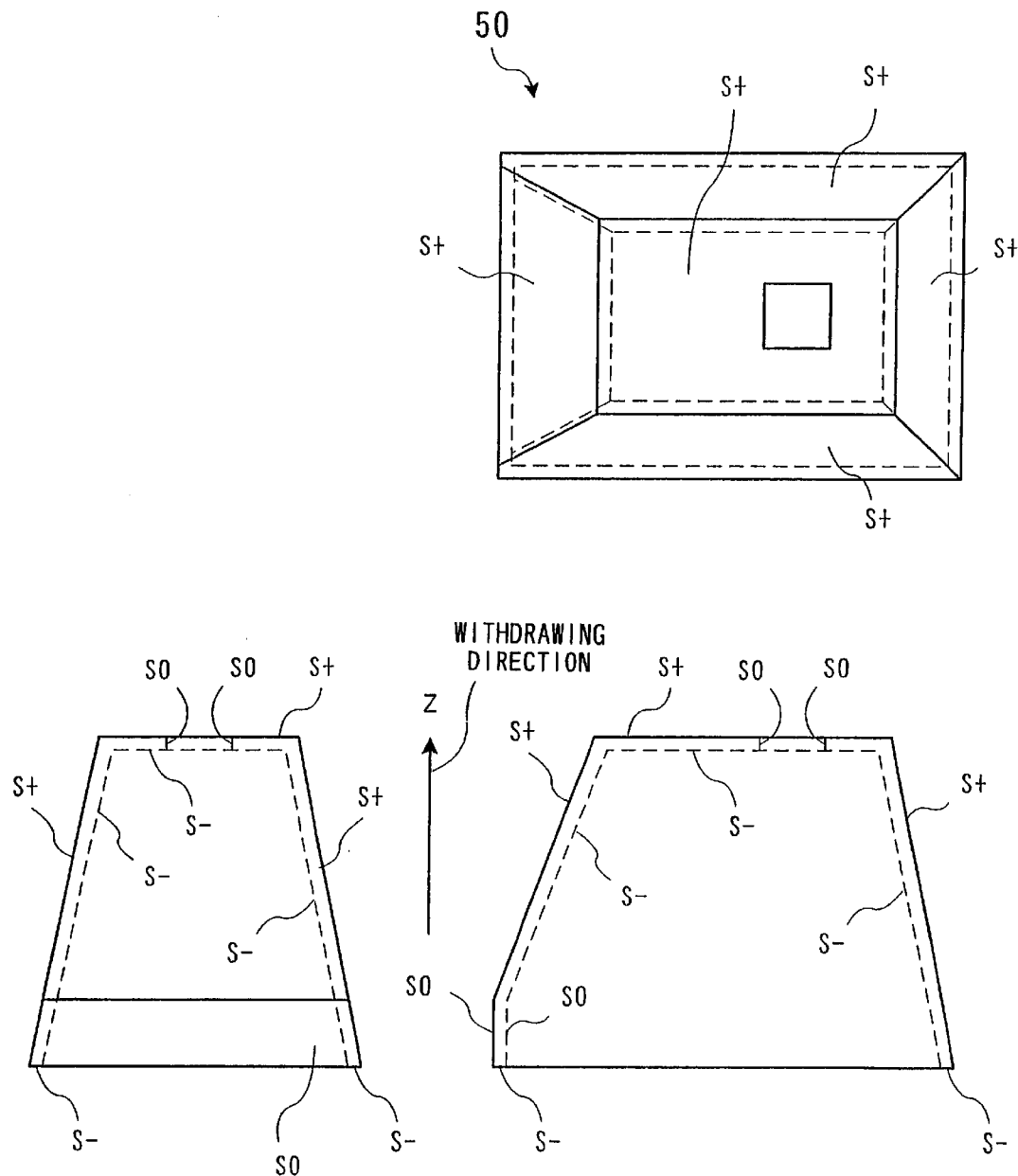
FIG. 9 illustrates sets to which individual faces belong.

FIG. 9 illustrates the sets to which the individual faces belong. In the illustrated example, the faces S1 to S5 belong to the set S+. The faces S8 to S11 and S13 belong to the set S−, and the faces S6, S12 and S14 to S17 belong to the set S0.

The faces belonging to the set S0 are reclassified by the face classifying section 33. The face S6 belonging to the set S0, for example, shares the edge T1T2 with the face S13 belonging to the set S−, and this face S6 belonging to the set S0 and sharing the edge T1T2 is reclassified into the set S−. A similar process is performed also with respect to the other faces S12 and S14 to S17 belonging to the set S0.

Figure 10:
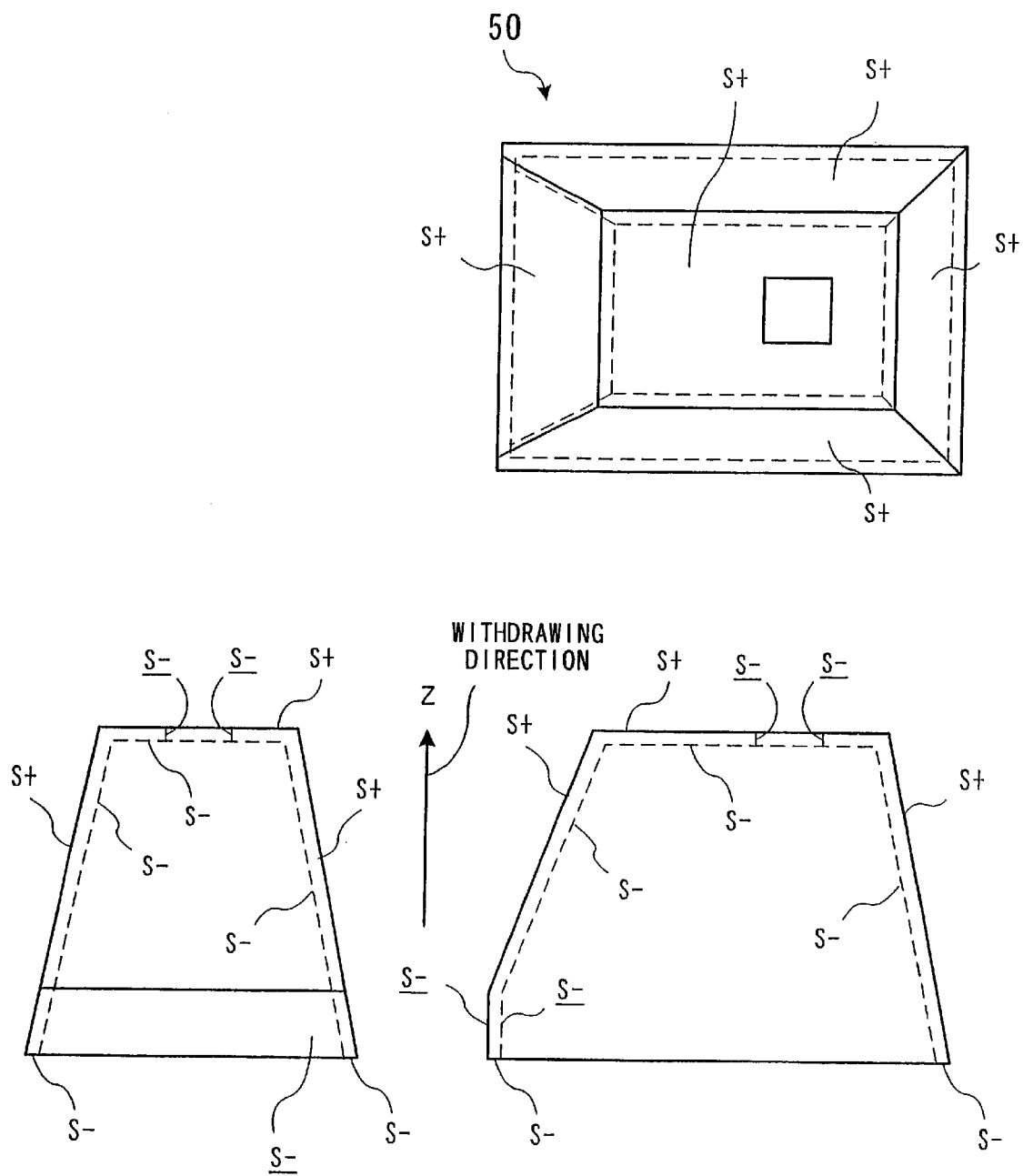
FIG. 10 illustrates results of reclassification of faces.

FIG. 10 illustrates the results of reclassification of the faces. As a result of the reclassification of the faces belonging to the set S0, the faces S6, S12 and S14 to S17 are reclassified into the set S−. In FIG. 10, underlined reference signs indicate the reclassified faces.

After all faces are classified into either the set S+ or the set S−, the parting line determining section 34 obtains a boundary between the faces belonging to the set S+ and those belonging to the set S−. The edge at the boundary is determined as the parting line.

Figure 11:
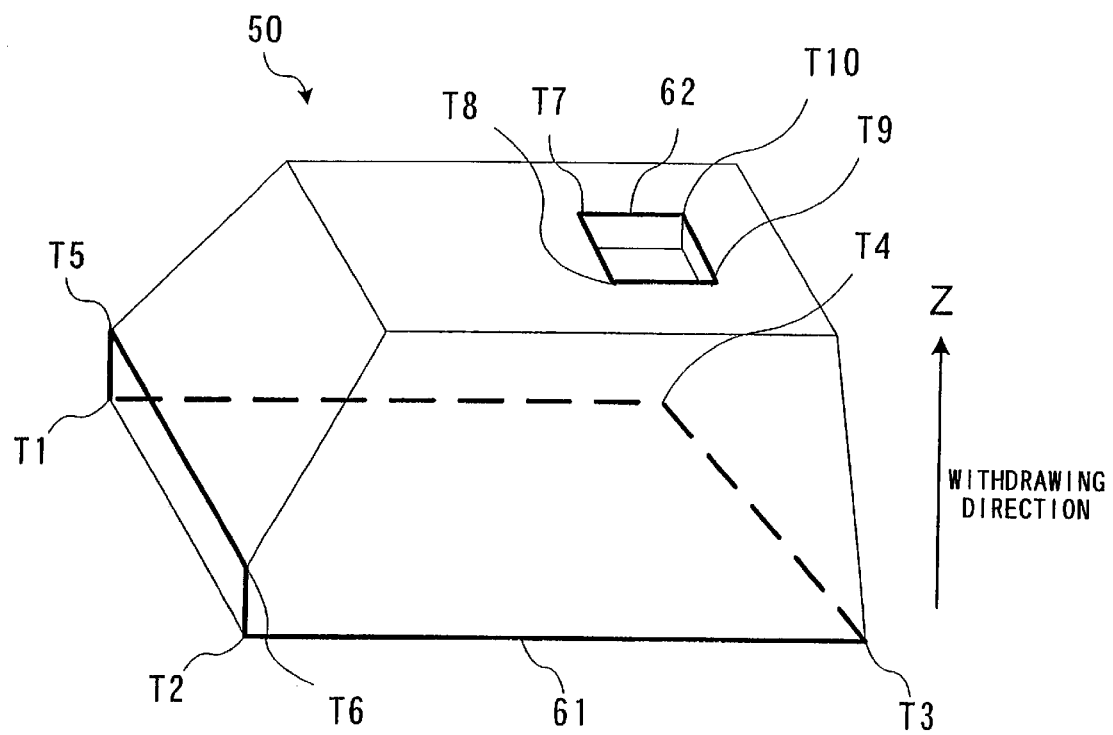
FIG. 11 is a diagram illustrating determined parting lines.

FIG. 11 shows parting lines thus determined. In the illustrated example of the three-dimensional model 50, two closed loops, that is, a parting line 61 along the outermost periphery passing T1→T5→T6→T2→T3→T4→T1, and a parting line 62 along the upper edge of the hole passing T7→T8→T9→T10→T7, are obtained. Based on the parting lines 61 and 62, the mold shape computing section 35 calculates the shapes of cavity-side and core-side parts.

Meanwhile, Step ST6 in the flowchart of FIG. 4 may be modified in the manner described below. Specifically, Step ST6 is modified such that, among the faces belonging to the set S0, those sharing a common edge with a face belonging to the set S+ are reclassified into the set S+ while the remaining faces are reclassified into the set S−. Step ST6 modified in this manner provides the results stated below.

Figure 12:
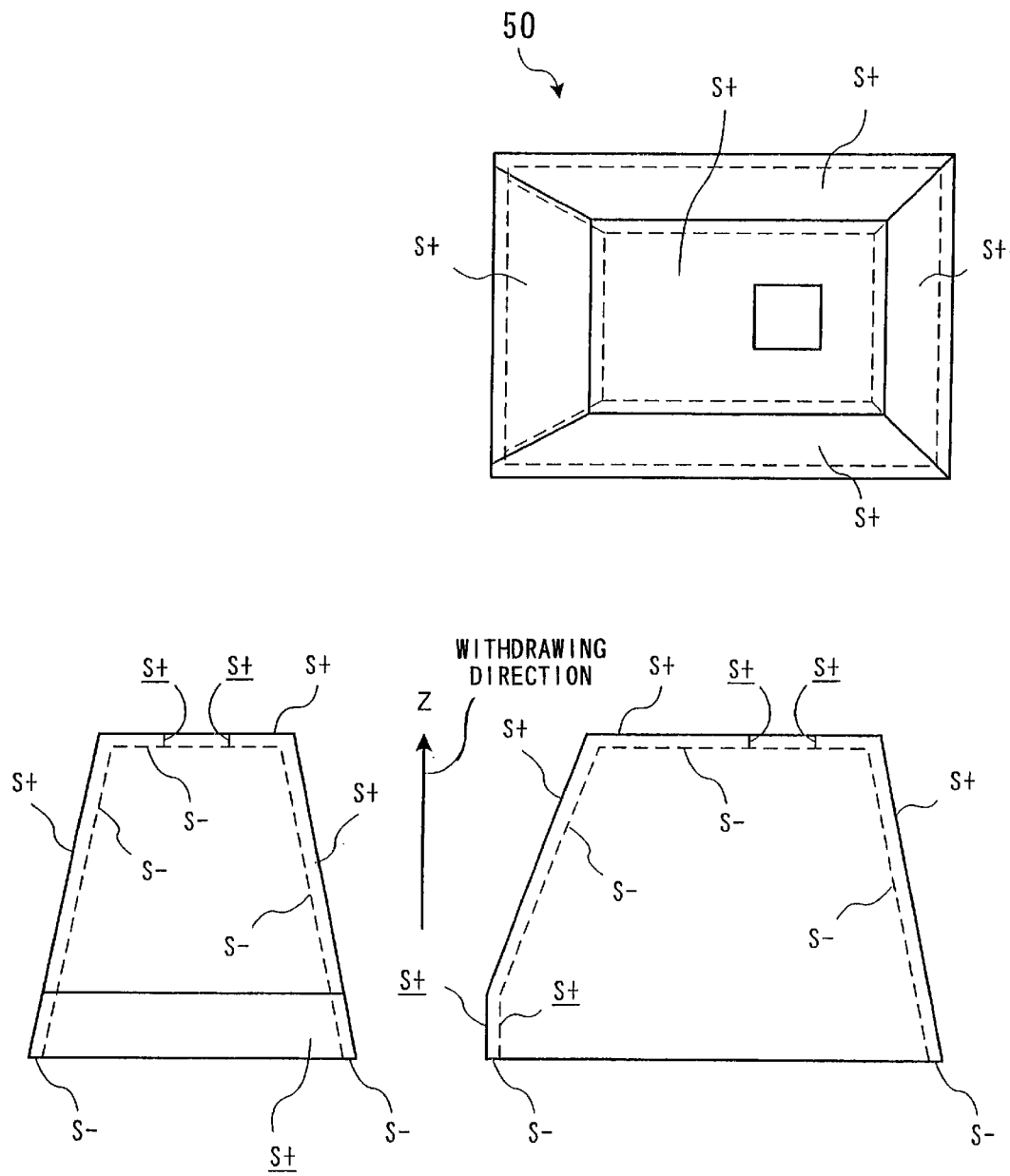
FIG. 12 illustrates another example of face reclassification results.

FIG. 12 shows the results obtained by reclassifying the faces in the above manner. In the illustrated example, as a result of the reclassification of the faces belonging to the set S0, the faces S6, S12 and S14 to S17 are reclassified into the set S+. Consequently, different parting lines are obtained by the parting line determining section 34.

Figure 13:
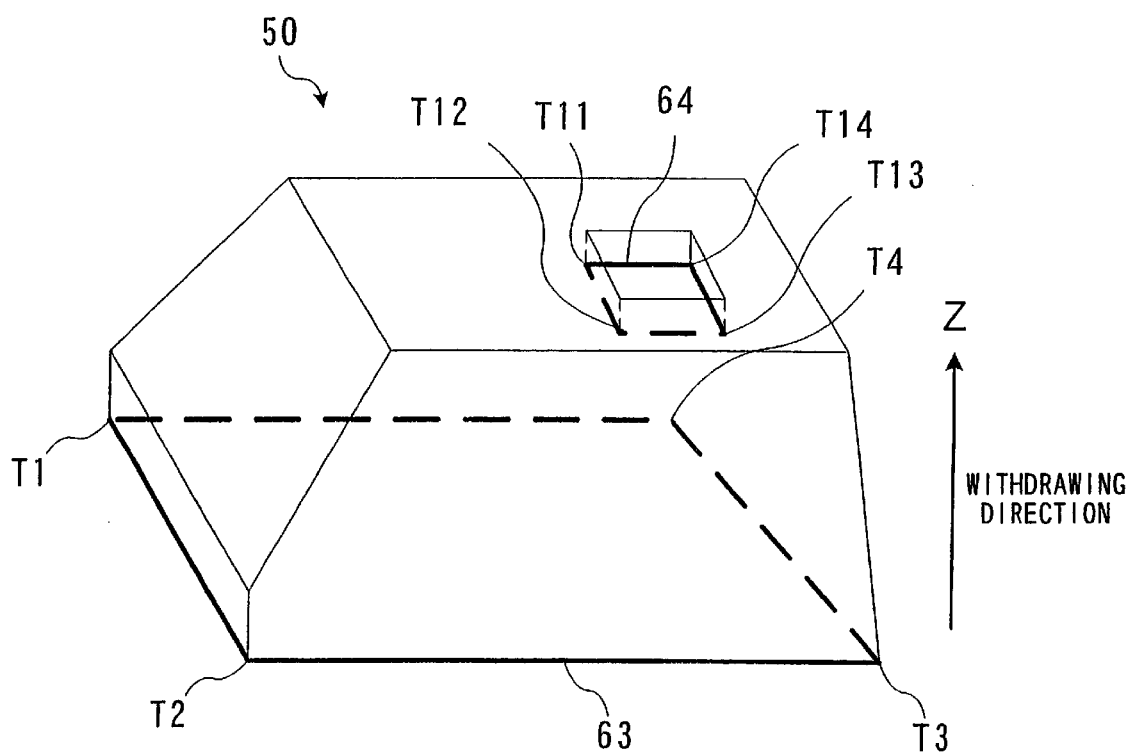
FIG. 13 is a diagram illustrating another example of determined parting lines.

FIG. 13 illustrates the parting lines determined in this manner. In this example, a parting line 63 along the outermost periphery passing T1→T2→T3→T4→T1 and a parting line 64 along the lower edge of the hole passing T11→T12→T13→T14→T11 are determined.

The system of the invention has the function of permitting only one of the groups S− and S+, into which the faces belonging to the group S0 are to be reclassified, to be selected in the first place, and in accordance with the designer's selection suited to the product shape, the system outputs possible parting lines matching the selection. This provides increased option in the design of parting lines.

Also, the process flow shown in FIG. 4 can detect an undercut.

Figure 14:
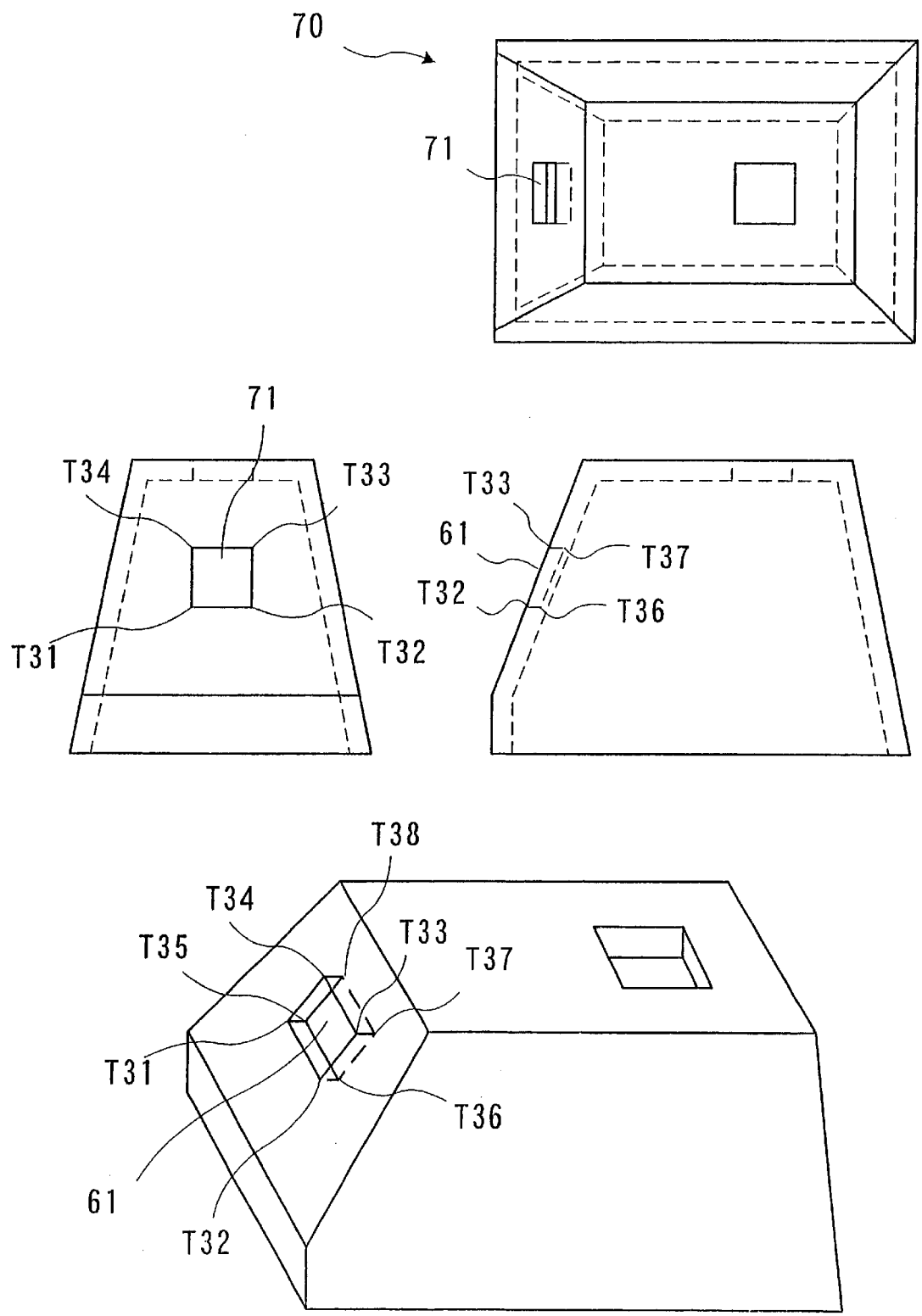
FIG. 14 illustrates an example of a model having an undercut.

FIG. 14 shows an example of a model having an undercut. This three-dimensional model 70 has a basic shape identical to that of the aforementioned three-dimensional model 50, except for a recess 71 formed in a left side face. The recess 71 is defined by edges connecting eight points T31 through T38. The faces of the three-dimensional model 70 are classified into the sets S+, S− and S0, as stated below.

Figure 15:
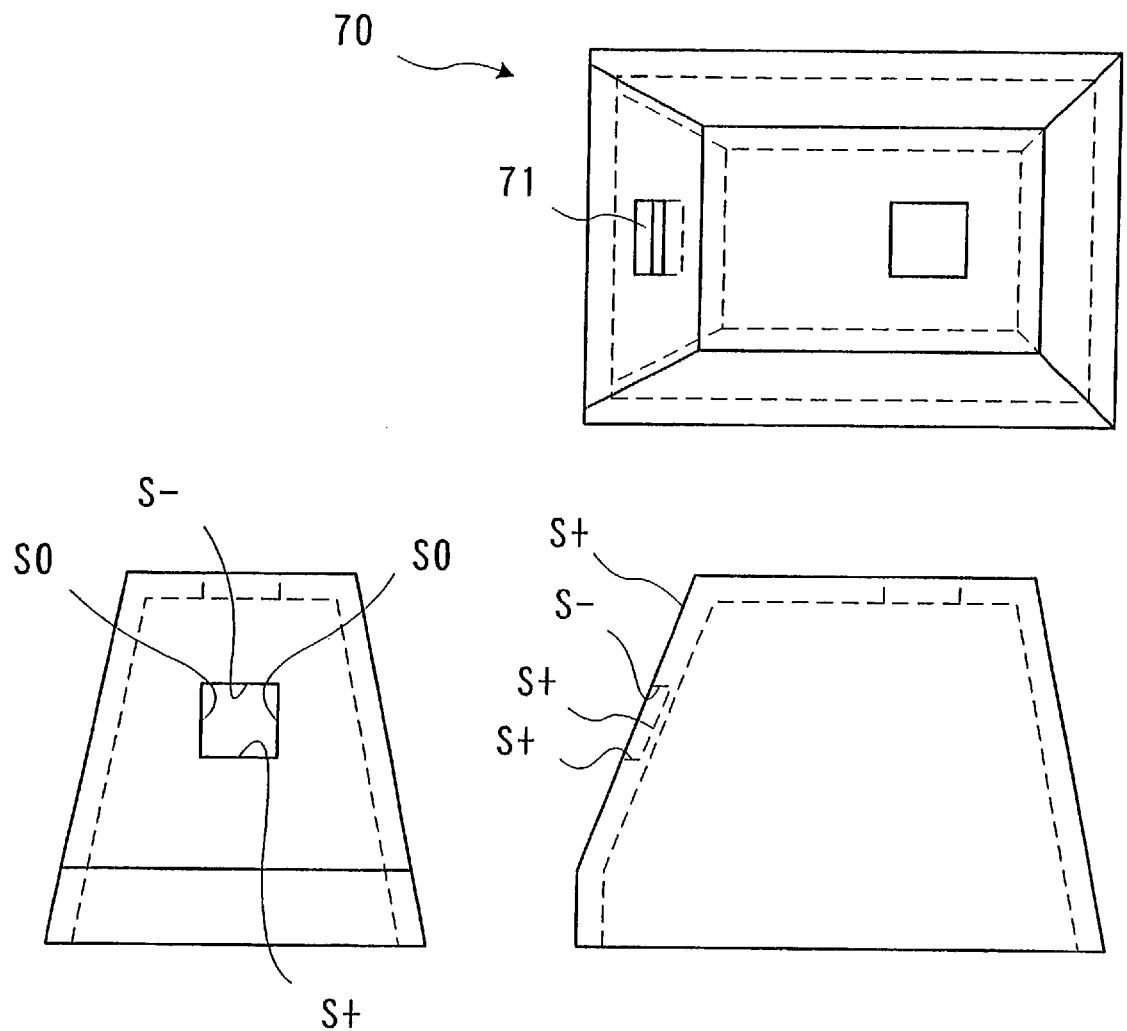
FIG. 15 illustrates results of classification of the faces of the model having an undercut.

FIG. 15 illustrates the results of classification of the faces of the model having an undercut. The figure shows the sets of only those faces located around the recess 71. Among the faces classified in this manner, those belonging to the set S0 are reclassified as follows.

Figure 16:
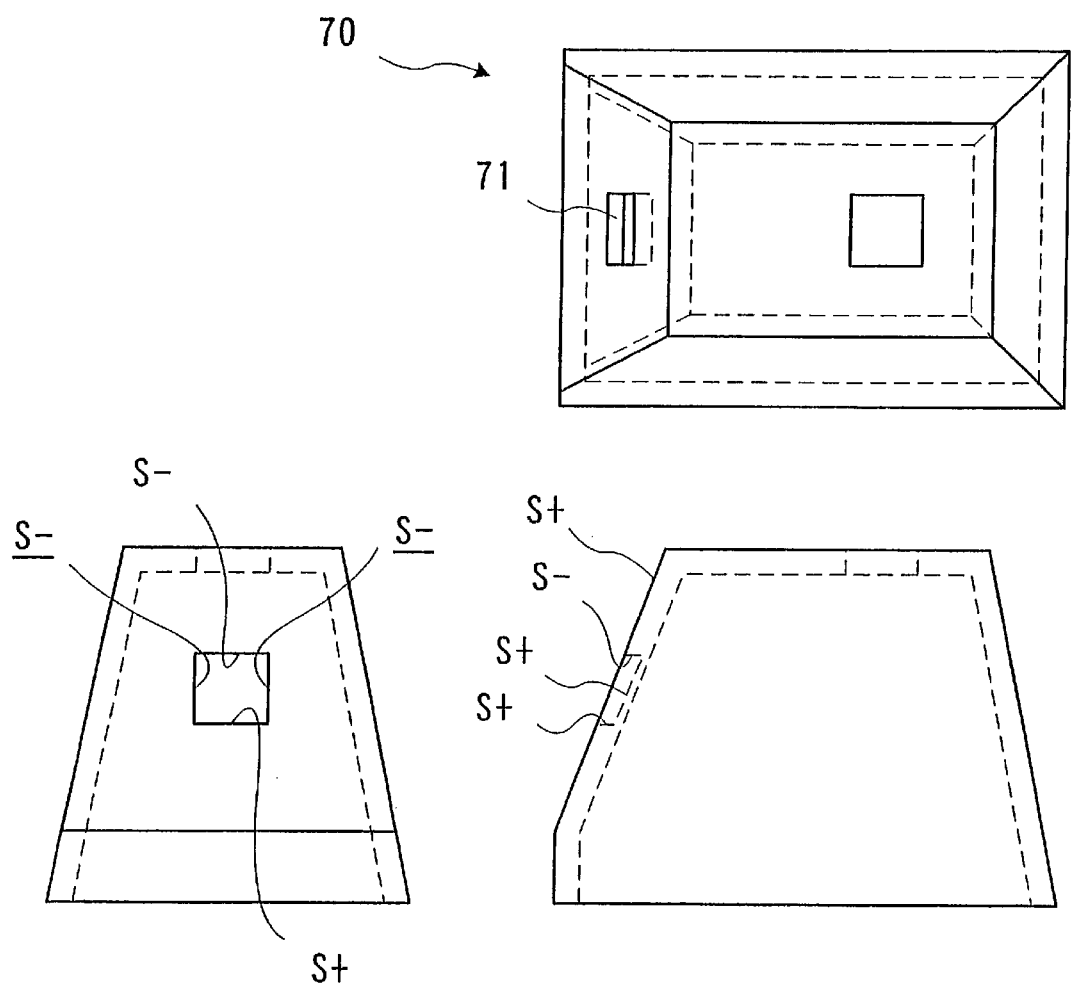
FIG. 16 illustrates results of reclassification of the faces of the model having an undercut.

FIG. 16 illustrates the results of reclassification of the faces of the model having an undercut. In the illustrated example, among the faces belonging to the set S0, those sharing a common edge with a face belonging to the set S− are reclassified into the set S− while the remaining faces are reclassified into the set S+. In the figure, the reference signs of those faces which are reclassified as S− in Step ST6 are underlined. Based on the thus-obtained classification results, the parting line determining section 34 determines a parting line.

Figure 17:
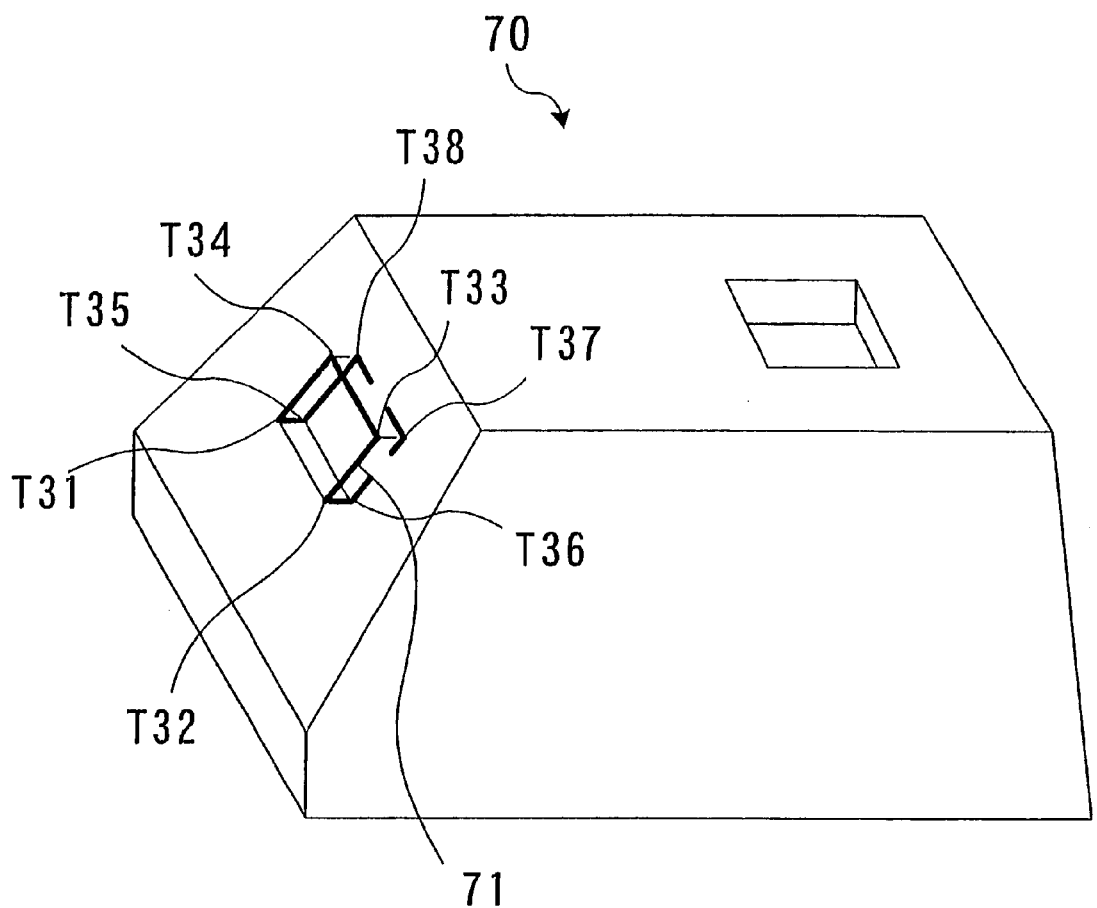
FIG. 17 is a diagram illustrating a parting line of the model having an undercut.

FIG. 17 shows a parting line determined for the model having an undercut. In the illustrated example, a closed loop passing T31→T35→T38→T37→T36→T32→T33→T34→T31 is determined as a parting line 71. No vertical hole is cut at the location of the parting line 71, and thus it can be concluded that an undercut exists at this location. On confirming that an undercut exists, the designer designs a slide core.

A procedure for processing a product model including a curved face will be now described. In the examples described above, the three-dimensional model is constituted by plane faces only, and therefore, the individual faces can be classified by using normal lines normal to the respective faces. An actual three-dimensional model, however, very often includes a curved face, which is processed in the manner described below.

Where a curved face is included in the three-dimensional model, the normal line derived in Step ST3 in FIG. 4 is defined as follows:

First, the curved face is represented by the following parametric equation:

$$r=r(u, v)$$

If the values of both u and v are fixed, a point on the curved face is specified, and if one of the two values is fixed, a curved line on the curved face is specified.

Figure 18:
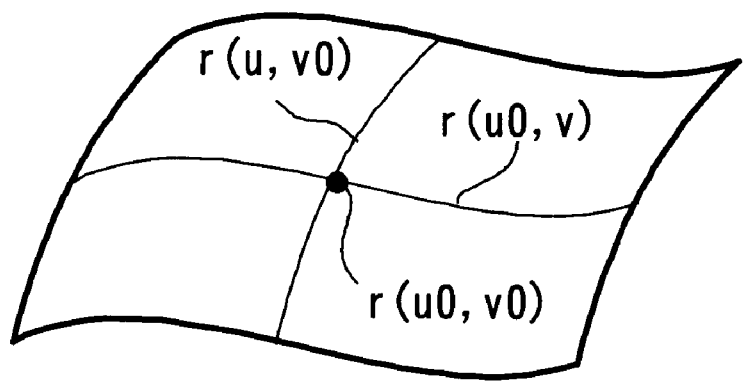
FIG. 18 is a diagram showing a point and curved lines on a curved face.

FIG. 18 shows a point and curved lines on the curved face. If, in the equation of the curved face, u=u0 and v=v0 are specified, then a single point on the curved face is defined. Also, if either u=u0 or v=v0 is specified, a curved line passing through the point defined by r(u0, v0) is obtained.

For simplicity of explanation, the ranges of the two parameters are defined as $$0 \leq u \leq 1, 0 \leq v \leq 1$$

In this case, points P0 to P3 at the four corners of the curved face are represented as follows:

P0=r(0, 0), P1=r(0, 1), P2=r(1, 0),
P3=r(1, 1)
Also, four sides Q0 to Q3 are represented as follows:
Q0=r(u, 0), Q1=r(u, 1), Q2=r(0, v),
Q3=r(1, v)
The middles points P4 to P7 of the respective four sides are given by
P4=r(0.5, 0), P5=r(0.5, 1), P6=r(0, 0.5)
P7=r(1, 0.5)

The normal line of the curved face is defined as a perpendicular line at each of points P0 to P7 perpendicular to two curved lines r(u, v) passing the point, and a positive direction of the perpendicular line is defined as the direction in which the curved face faces. For example, the normal line at point P0 is defined as a perpendicular line perpendicular to Q0 and Q2.

Figure 19:
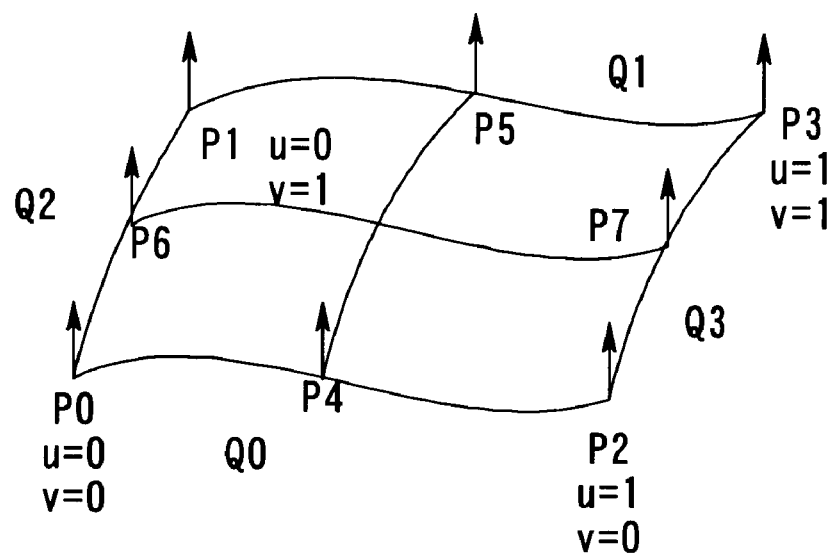
FIG. 19 is a diagram showing normal vectors on the curved face.
Figure 20:
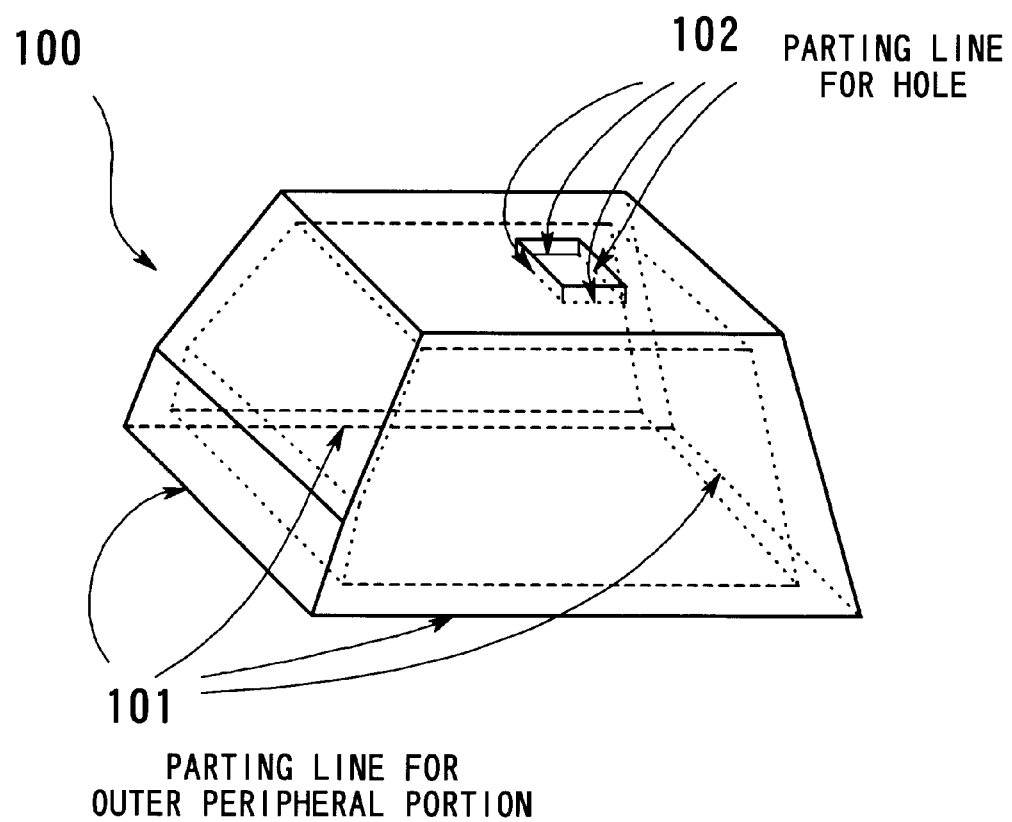
FIG. 20 is a diagram illustrating, by way of example, parting lines of a product.
Figure 21:
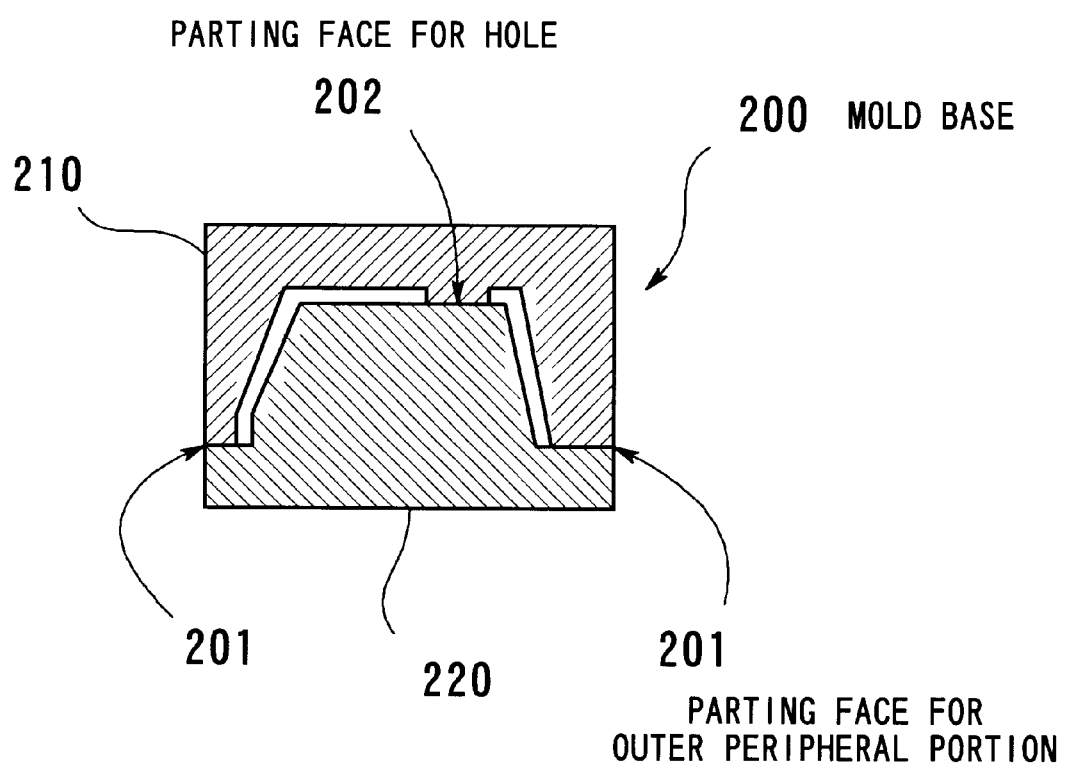
FIG. 21 is a diagram illustrating parting faces of a mold base.
Figure 22:
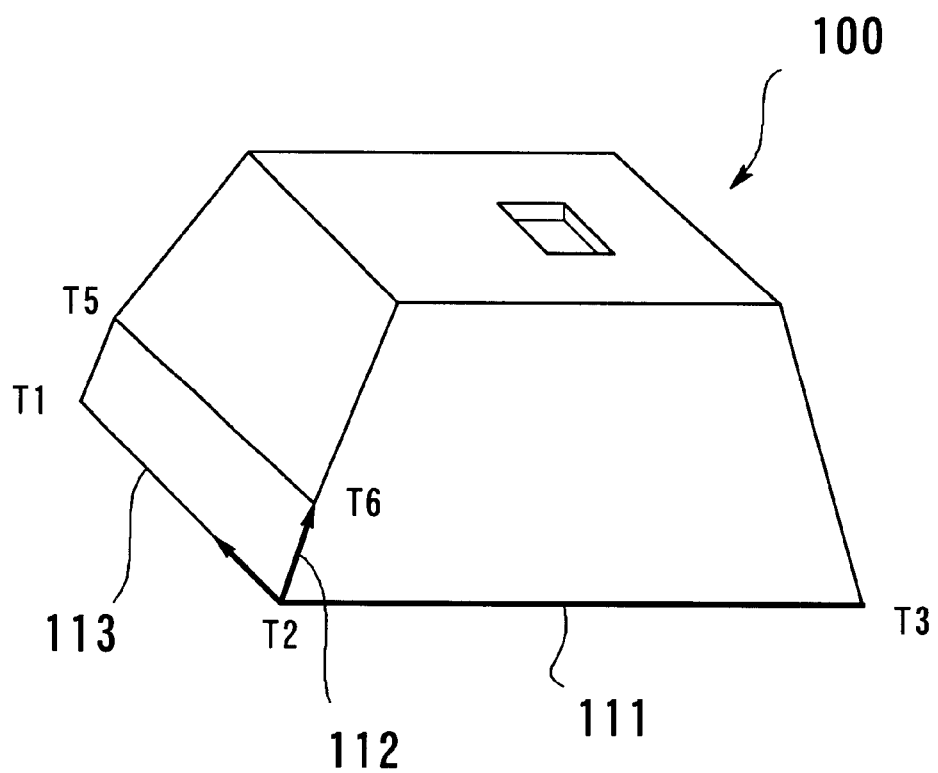
FIG. 22 is a diagram illustrating a method of determining a parting line in a conventional system.

FIG. 19 shows normal vectors on the curved face. As illustrated, normal vectors at eight points on the edges of the curved face are obtained. The middle points of the curved lines are also included so as to grasp as many transitions within the curved face as possible.

After the normal vectors are obtained in this manner, the face is classified in Step ST4 of the process flow shown in FIG. 4, in the manner described below.

(1) If the Z-direction components of all normal vectors are equal to or larger than zero and the Z-direction component of at least one normal vector has a positive value, the face is classified into the set S+;

(2) If the Z-direction components of all normal vectors are equal to or smaller than zero and the Z-direction component of at least one normal vector has a negative value, the face is classified into the set S−;

(3) Otherwise the face is classified into the set S0.

The processes performed in ST6 and ST7 in cases where a curved face is included are the same as those executed with respect to plane faces, explained above with reference to the process flow of FIG. 4.

In this manner, a three-dimensional model including curved faces also can be subjected to the automatic parting line decision process.

As described above, with the mold design system according to the present invention, a parting line is automatically obtained based on the orientations of faces constituting an article, whereby the efficiency of design work improves.

Also, by determining the orientation of a face based on normal lines at a plurality of points on the face, it is possible to cope with a product of which the faces include a curved face, so that a more practical mold design system can advantageously be provided.

The faces are classified according to the angles of normal vectors of the respective faces with respect to the withdrawing direction, and faces which are oriented at right angles to the withdrawing direction are classified into the same sets as those sharing a common edge. Accordingly, an appropriate parting line can be efficiently determined, thus shortening the processing time.

Further, the operator is allowed to specify to which set faces oriented at right angles to the withdrawing direction should belong. Thus, by changing the specification, it is possible to obtain a plurality of possible parting lines, whereby the degree of freedom in mold design is expanded.

The contents of the above-described processes may be described in a program recorded in a computer-readable recording medium. By executing the program by a computer, it is possible to perform the above-described processes. The computer-readable recording medium includes magnetic recording device, semiconductor memory and the like. To distribute the program to the market, the program may be stored in portable recording media such as CD-ROMs (Compact Disk Read Only Memories) or floppy disks. Alternatively, the program may be stored in the storage device of a computer connected to a network and may be transferred to other computers through the network. To execute the program by a computer, the program stored in a hard disk unit or the like of the computer is loaded into the main memory and executed.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A mold design system for designing a mold for making molded articles, comprising:

face orientation acquiring means for obtaining orientations of faces constituting a shape of an article to be produced using the mold;

face classifying means for classifying the faces into a plurality of sets according to the respective orientations obtained by said face orientation acquiring means; and parting line determining means for determining, as a parting line of the mold for forming the article shape, a boundary between faces that are classified into different sets by said face classifying means.

2. The mold design system according to claim 1, wherein said face orientation acquiring means acquires the orientation of each of the faces constituting the article to be produced using the mold, by means of normal lines at a plurality of points on said each face.

3. The mold design system according to claim 1, wherein said face classifying means classifies the faces by using, as a reference direction, a withdrawing direction in which the article is withdrawn from the mold.

4. The mold design system according to claim 3, wherein said face classifying means classifies each of the faces into one of a first set of faces which are oriented at an acute angle to the withdrawing direction, a second set of faces which are oriented at an obtuse angle to the withdrawing direction, and a third set of faces which are oriented at right angles to the withdrawing direction; and among the faces of the third set, those faces which share a common edge with a face of the first set are included in the first set, while the remaining faces are included in the second set.

5. The mold design system according to claim 3, wherein said face classifying means classifies each of the faces into one of a first set of faces which are oriented at an acute angle to the withdrawing direction, a second set of faces which are oriented at an obtuse angle to the withdrawing direction, and a third set of faces which are oriented at right angles to the withdrawing direction; and the faces of the third set are included in either the first or second set in accordance with specification by an operator.

6. A computer-readable recording medium recording a mold design program for designing a mold for making molded articles, wherein the mold design program causes a computer to function as face orientation acquiring means for obtaining orientations of faces constituting a shape of an article to be produced using the mold, face classifying means for classifying the faces into a plurality of sets according to the respective orientations obtained by the face orientation acquiring means, and parting line determining means for determining, as a parting line of the mold for forming the article shape, a boundary between faces that are classified into different sets by the face classifying means.

* * * * *